Dec. 29, 1931.   W. W. MUIR   1,838,568

RADIATOR CORE FOR AUTOMOBILE COOLING SYSTEMS

Filed April 27, 1929

Inventor
W. W. Muir
By
Attorney

Patented Dec. 29, 1931

1,838,568

UNITED STATES PATENT OFFICE

WELLINGTON W. MUIR, OF LOCKPORT, NEW YORK, ASSIGNOR TO HARRISON RADIATOR CORPORATION, OF LOCKPORT, NEW YORK, A CORPORATION OF NEW YORK

RADIATOR CORE FOR AUTOMOBILE COOLING SYSTEMS

Application filed April 27, 1929. Serial No. 358,738.

This invention relates to the cores of radiators for the cooling systems of internal combustion engines or the like and has for its object to provide a more efficient construction which is less costly to manufacture than those heretofore proposed.

With these and other objects in view the invention consists in the novel details of construction and combinations of parts as will be more fully hereinafter disclosed and particularly pointed out in the claims.

Referring to the accompanying drawings forming a part of this specification in which like numerals designate like parts in all the views—

Figure 1:
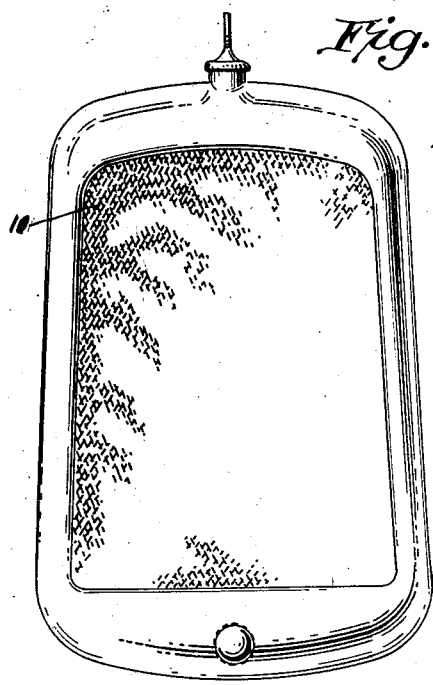
Fig. 1 is a front elevational view somewhat diagrammatic illustrating a radiator for an automobile containing a core and built according to this invention.

In order that this invention may be the better understood it is said that heretofore radiator core constructions have been such that either vertical or substantially horizontal water tubes have been formed which permit a passage of water therethrough with insufficient cooling thereof under some conditions. This has been caused by several factors such as inadequate dimensions or capacity, insufficient radiating surface for the transfer of heat from the cooling fluid to the atmosphere, a too direct passage for the cooling fluid through the radiator whereby insufficient time is given to the fluid for complete cooling thereof, and other factors which will be readily observed and understood by those skilled in the art.

The purpose of this invention is to provide a construction which is somewhat similar to prior constructions in that the core units are made from extremely thin metal strips which are preformed by crimping into shapes which will readily fit one another or which will fit separator strips provided therefor, all to the end that the passage of cooling fluid through the radiator core will be broken, interrupted, or otherwise affected so that a transfer of more heat to the atmosphere is accomplished because of the prolongation of the passage and increased turbulence of the fluid through the tubes of the core.

A still further object of the invention is to provide a construction offering less resistance but more turbulence to the air passing through the core for absorbing the heat given off from the cooling fluid.

This invention is particularly applicable to radiators having substantially hexagonally formed air cells in its core, it being understood that other forms may be readily devised which will still fall within the limits of this invention. The actual formation of these cells should be described so that the invention may be the better understood and therefore the following is directed to a disclosure of such construction.

Extremely thin sheets of soft metal, having high heat conductivity and such for example as copper or brass, are formed into narrow strips of about 2 to 3 inches width. This strip which is substantially continuous is fed from a roll through pressure rollers the surfaces of which constitute dies to impress in said strip a plural number of trough-like indentions 1 extending lengthwise of the strip, and to impress in the surfaces of these troughs at spaced intervals transverse rows of smaller indentions 2. Said rows are spaced from each other so that, in its continued passage through the forming machine, the core strip comes in contact with folding dies which depress the portions of the strip between the rows of smaller indentions and then these depressed portions are pinched together at the sides of the strip to form double thickness fins 3 extending laterally from the plane of the major portion of the strip.

The indentions 2 are substantially of spherical formation and the core strip is so fashioned by the dies that in each row of indentions there is a ridge, or lip, or meeting joint of metal which extends outwardly beyond the fins 3, and the metal forming such ridges has a surface angularity which renders the same as sides of a hexagon. That is to say from Figures 2 and 6 it will be seen that the edges 4 of the core unit are angularly disposed to each other, and the degree of angularity is that between two adjacent sides of a hexagon. The areas 4 extend only about three-sixteenths of an inch from the edge of the unit strip, or for a distance sufficient only for soldering two adjacent strips together.

The strip so formed is then cut into lengths slightly more than twice the dimension of the finished core measured from top to bottom thereof. In other words, if the core as completed is to be about twenty-four inches in height then these strips are cut into lengths of about fifty inches. The purpose of this is to permit these preformed strips to be folded upon themselves as clearly indicated in the drawings, the surplus metal being taken up in the folds 6 at the top and bottom so that when the ends of the strip are brought together and interlocked in the single joint as shown at 9 in Fig. 2 there will be formed a core unit of a length equal to the height of the finished radiator. A predetermined number of units are then assembled to form the finished core indicated at 10 in Fig. 1 and possessing the required heat conducting area. Division or separator strips may be placed between the fins of each unit as desired to assist in the radiation of heat as well as to strengthen the core. The fins form portions of the wall structure of the air cells 8, the remainder of the core unit and the separator strips forming the other walls of said cells. The troughs 1 constitute the main portions of tubes to conduct the cooling fluid, such as water, from side to side of the radiator during which travel the heat from said fluid is abstracted and transferred to the air passing through the air cells. The formation of the radiator core unit strips may be readily understood from the foregoing and with reference to prior issued patents such for example as 1,169,481 granted Jan. 25, 1916, to Herbert C. Harrison for process of making automobile radiator sections.

Figure 2:
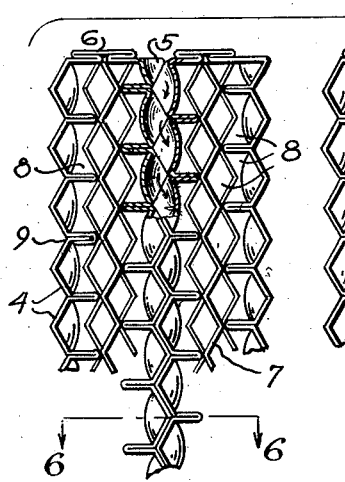
Fig. 2 illustrates the assembly of a portion of a radiator core and including a plurality of core units, said figure being in vertical detail partly in section to the better illustrate the construction, and said figure also including elemental parts going to make up the assembly.

Referring to Fig. 2 there is disclosed a radiator core construction in which a flat strip of very thin metal is employed which has been previously passed through forming rolls as above described to impress therein the troughs 1 as well as rows of substantially spherical indentions 2 with folds constituting fins 3 separating the rows of indentations. From Fig. 5 it will be observed that in the formation of the troughs 1 there are created flanges 4 at each side edge of the core strip, said flanges having plane surfaces for the purpose of securing one radiator core unit to its adjacent unit. That is to say, there are provided a plurality of these flanges 4 the surfaces of all of which are hexagonally disposed so that when one unit is brought up against an adjacent unit the two units may be secured together as with solder to form sides of hexagonal air cells 8 as clearly shown in Fig. 2 the coincident troughs of the adjacent units forming the water tubes or passages 5 therebetween.

Radiator constructions are so well known that the above will be readily understood by one skilled in the art particularly with reference to the drawings, but it might here be stated that these preformed strips are folded back upon themselves creating a fold such as shown at 6 in Fig. 2 and a separator strip as shown at 7 is inserted between the folded over portions of the strip and against which the fins 3 will contactingly rest so that as the heated fluid, such as water, courses down the water tube 5, as idicated by the arrows in Fig. 2, the heat from said water will be taken up by the thin metal of the core and this heat will be transferred through the fins 3 and separator plate 7 to the atmosphere which is passing through the spaces 8 known as the air cells of the radiator. In other words, by the foregoing description it will be understood that a core is formed providing closed water passages 5, and openings 8 for the atmosphere which are not closed at their ends, whereby said atmosphere is free to pass through said spaces and over the surfaces of the metal forming the radiator core.

Figure 4:
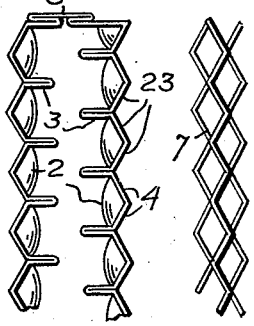
Figs. 3 and 4 show respectively a top plan view and perspective view of the portion of the separator strip shown in Fig. 2.
Figure 3:
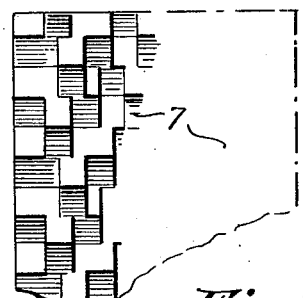

It is to be observed from Figs. 2, 3 and 4 that the separator strip 7 comprises a plane piece of metal which has been cut and expanded in opposite directions as disclosed in the U. S. Letters Patent #1,220,745 granted March 27, 1917 to Herbert C. Harrison and entitled "Automobile radiator" and that the fins 3 are disposed in staggered relation with each other on opposite sides of said strip. By this construction the indentions 2 are likewise made to assume staggered positions with respect to each other whereby the water in the tube 5 will travel in a zig-zag path instead of in a truly vertical path. This is clearly indicated by the arrows in Fig. 2 and therefore no further description is deemed necessary except to state that by this construction not only is the length of the water column increased from the top to the bottom of the core but the water while passing through the tube is subjected to a greater turbulence than in constructions heretofore known, whereby an increased transfer of heat to the metal of the core is accomplished, without unduly restricting the flow through each tube. As a result a higher mean temperature of the metal of the entire core is obtained which insures maximum heat transfer to the air.

Figure 5:
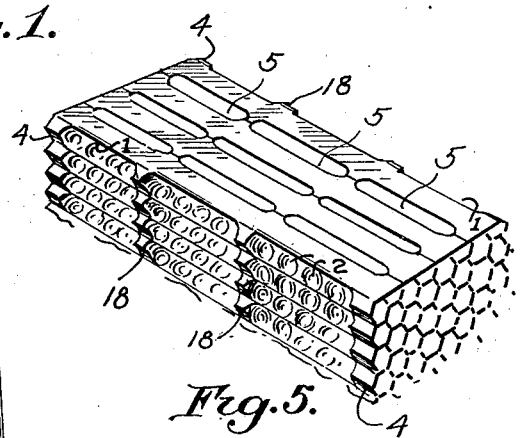
Fig. 5 is a perspective view somewhat diagrammatic illustrating an assembly of core units for a radiator requiring larger water cooling capacity and such for example as found in airplanes or automobiles of extremely high horse power.
Figure 6:
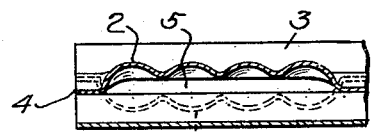
Fig. 6 is a horizontal sectional view across one of the water tubes taken as on the line 6—6 of Fig. 2 and looking in the direction of the arrows.

Also it is to be observed that the indentions, as clearly seen in Figs. 2, 5 and 6 are substantially semispherical in form and of a size maximum to the dimension between the fins 3 whereby practically all the metal between said fins is deflected out of the axial line of the water tube 5 to create the greatest possible degree of deflection of the water column in the core. With reference to Fig. 6 which is a horizontal sectional view of the parts shown in Fig. 2 it will be seen that should any foreign matter pass over with the cooling fluid from the engine and become wedged in any one of the indentions 2, the continued passage of water is not affected since the following flow will pass to either side of the obstruction. In other words, by this construction there is provided not only a means of conducting the heated fluid through the core from the top to the bottom thereof, but there is provided additional means of automatically increasing the cooling effect by making the indentions lie in staggered relation with each other and further there is provided means for permitting the water in its flow from the top to the bottom of the core to travel laterally from one vertical pair of indentions to another in a direction from the front to the back of the radiator whereby the maximum cooling effect is had. Also it will be evident from the drawings especially Figures 5 and 6 that the air in passing through the core will contact with the spherical walls of the rows of indentions 2 with the result that the air column will be disturbed, broken up, or otherwise affected to create a greater turbulence thereof than if there were no indentions. Therefore there results a greater absorption by the air of the heat from the metal. From actual experiment it has been observed that these indentions 2 should be of a depth maximum to the elasticity of the metal. In other words the efficiency of the heat transfer increases with the depth of said indentions, and rapidly falls off with a decrease in depth.

In the preceding constructions it should be stated that the pre-crimped strips forming the water tubes as well as the separator strips associated therewith are preferably formed of extremely thin metal, and in practice they are made of brass as well as copper. Each core unit is formed as above described but it should here be stated that the joint 9 of each is soldered to close one wall of the water tube against leakage. After the parts have been assembled to form the entire radiator core, a clamp is placed around the assembly and pressure applied to hold the parts in tight contacting engagement. The core with the encompassing clamp is then laid in a bath of solder so that the entire surfaces 4, see Fig. 4, will take up the solder and thus secure the core as a unified mass. The assemblage is then turned over and the other side immersed so that the solder may affect the surfaces 4 of the opposite side of the radiator, all as will be readily understood. The clamp is removed after the solder has cooled and the unified radiator mass placed within its encompassing shell and thus made ready for attachment to the automobile chassis.

In Fig. 5 it will be seen that between the sides of the core unit, at equal spacings, there are formed series of raised portions 18 the purpose being to use the same as abutments to add strength to the core assembly as well as to keep separated the opposite walls of a water tube 5.

This invention is not to be confused with the inventions disclosed in my co-pending applications Serial Nos. 358,725 and 358,737, each entitled "Radiator core for automobile cooling systems" and each filed concurrently herewith. That is to say, in application Serial No. 358,725 there is disclosed a radiator core having square air cells formed by core strips bent around and separated by an intermediate or separator strip which is perfectly plane. In other words, said separator strip is in its original sheet formation and is inserted between the fins of the core strips and is unsecured to said fins except at the extreme ends thereof. Further the water tubes are formed by a plurality of spherical indentions in the surface of the core strips and these strips with their indentions are so assembled that positive turbulence is given the water coursing through said tubes. Not only this but positive turbulence is given to the air passing through the air cells due to the spherical formation of said indentions.

On the other hand in application Serial No. 358,737 there is disclosed a core having hexagonally formed air cells instead of square ones. Also the core strips of this application are assembled to form core units which are devoid of any separating strips therebetween whereby a greater number of water tubes is made possible in a core of the same frontal area. Also the fins are so formed that there may be water therein extending in a lateral plane from the main water column whereby a more direct transfer of heat from the water to the metal of the core is made possible through said fins.

According to the invention disclosed in this application there is provided a core made up of strips bent around upon themselves in spaced relation to form core units adapted to receive an intermediate or separator strip in such fashion that hexagonal air cells are produced. Each strip is formed with rows of indentions substantially of spherical formation whereby the air in passing through said cells is given a high degree of turbulence. In other words, the air column is not free to slip through the cells but in its passage it must contact with the spherical obstruction and in passing therearound the molecules of the column are disturbed and interchanged to such extent that the outer molecules of the column first come in contact with the metal and then are displaced to permit the inner molecules to come in contact with said metal whereby substantially all the molecules of said column make such contact with greater resultant heat transfer, as will be readily understood. Also the fins 3 according to this invention are preferably closed tightly through their length. It should also be observed that the separator strip of this application is so cut and distorted that there are actual passages therethrough and should an obstruction occur in one of the air cells air from another cell is free to reach the obstructed cell through said passages.

It is obvious that those skilled in the art may vary the details of construction and arrangements of parts constituting the article, as well as the steps and combinations of steps constituting the method without departing from the spirit of the invention and therefore it is not desired to be limited to the foregoing except as may be demanded by the claims.

What is claimed is:—

1. The herein described radiator unit comprising outer walls formed from sheet metal folded to provide a plurality of fins the double walls of which are in tight contact, said sheet bent upon itself with a separator strip between and the ends of said sheet secured together in a fin to provide an impervious unit wall, the portions of said sheet between said fins provided each with a plurality of indentions arranged in a row said indentions meeting said fins to provide between each vertical pair of indentions a lip, and a serrated flanged edge portion on each side of said sheet for interfittingly engaging the serrated edge portion of a similarly formed adjacent unit.

2. The herein described radiator unit comprising outer walls formed from sheet metal folded to provide a plurality of fins, said sheet bent upon itself with said fins inwardly disposed in staggered relation with a separator strip between and the ends of said sheet secured together in a fin to provide an impervious unit wall, the portions of said sheet between said fins provided each with a plurality of spherical indentions arranged in a row, said indentions in vertical alignment and meeting said fins to provide between each vertical pair of indentions in one wall a lip disposed opposite a row of indentions in the other wall whereby positive turbulence is given to the water flowing between said walls, and a serrated flanged edge portion on each side of said sheet for interfittingly engaging the serrated edge portion of a similarly formed adjacent unit, the two units so joined forming therebetween a water tube comprising the vertical series of said indentions.

3. The herein described radiator unit comprising outer walls formed from sheet metal folded to provide a plurality of fins, said sheet bent upon itself with a separator strip between and the ends of said sheet secured together in a fin to provide an impervious unit wall, the portions of said sheet between said fins provided each with an abutment and a row of spherical indentions on each side of said abutment, the indentions of each row meeting said fins and each other, a serrated flanged edge portion on each side of said sheet for interfittingly engaging the serrated edge portion of a similarly formed adjacent unit, the two units joined and soldered under pressure form therebetween a water tube comprising the said indentions, as well as to form a cellular air conducting structure in each unit, said air-cellular structure comprising said separator strip and all of said fins in staggered interfitting heat conducting relationship therewith.

In testimony whereof I affix my signature.

WELLINGTON W. MUIR.